July 13, 1926.
J. J. ALLINSON
1,592,324
TREATMENT AND REFINING OF MINERAL OILS
Filed May 4, 1920
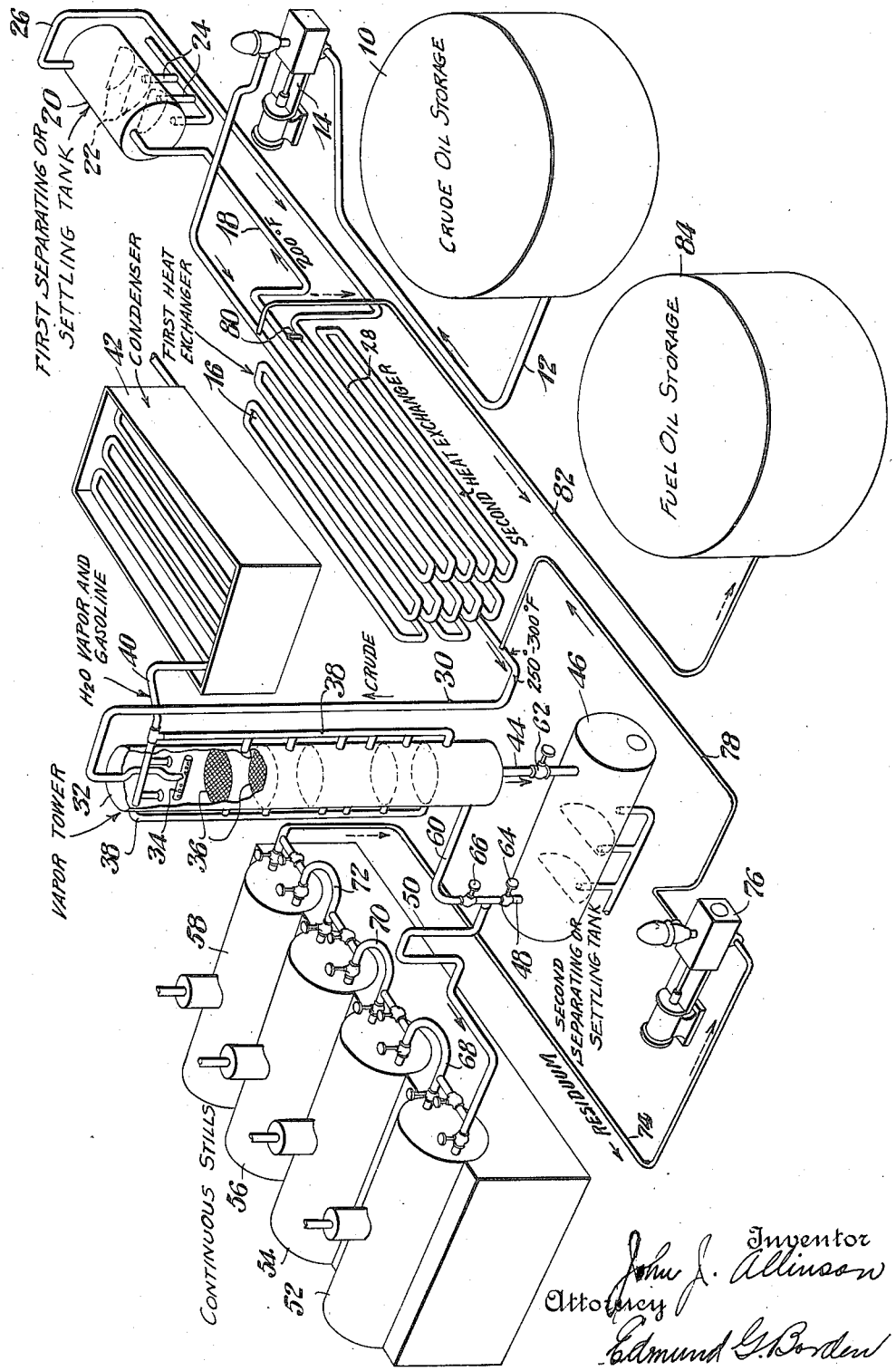

Patented July 13, 1926.

1,592,324

UNITED STATES PATENT OFFICE.

JOHN JOSEPH ALLINSON, OF BARTLESVILLE, OKLAHOMA, ASSIGNOR, BY MESNE ASSIGNMENTS, TO DOHERTY RESEARCH COMPANY, OF NEW YORK, N. Y., A CORPORATION OF DELAWARE.

TREATMENT AND REFINING OF MINERAL OILS.

Application filed May 4, 1920. Serial No. 378,733.

The present invention relates to the treatment and refining of mineral oils, and more particularly to a process and apparatus for treating and refining crude petroleums containing natural brines which do not readily separate from the oil at ordinary temperatures.

The crude petroleum oils obtained in many localities are not produced in a pure state, but are mixed with water or natural brines which occur in strata adjacent the oil-bearing stratum and which become mixed with and disseminated throughout the oil as the latter flows, or is pumped, from the well. These natural brines contain chlorides, sulphates and carbonates of sodium, magnesium and calcium, and other salts of similar nature and on being dispersed throughout the oil form a more or less permanent emulsion from which they do not settle at ordinary temperatures, and from which they cannot be readily separated without the use of heat. The heating of mixtures of oil and brine of this type involves many difficulties, more especially if the heating is attempted in the oil stills during the distillation of the oil. If the mixture of oil and water or brine is heated above the boiling point of the water, as is very often the case when the mixture is distilled, the small drops of water scattered throughout the oil tend to evaporate suddenly, with explosive speed, and to cause foaming and "puking" of the still, and otherwise interfere with the orderly operation of the distilling process.

As the oil and water are evaporated, the salts contained in the brine crystallize out and form a hard, rock-like scale or deposit on the heating surface of the still, thereby increasing the resistance to the transfer of heat to the oil and causing an overheating of the still walls. As a result of these deposits the stills must frequently be shut down and the scale removed. Moreover, when oils containing certain types of brine are heated in this manner, the deposited sediment or scale corrodes the heating surface and causes a very rapid deterioration of the still.

The primary object of the present invention is, therefore to provide a process in which brine may be removed from a mixture of oil and water without forming a deposit of salt or other sediment during the heating of the oil.

Another object of the invention is to provide a process in which a mixture or emulsion of oil and brine may be continuously treated and refined.

A further object of the invention is to provide an apparatus in which a mixture or emulsion of oil and brine may be continuously treated and refined without forming a deposit of salt or similar substances on the heating surface of the apparatus.

With these and other objects in view, the invention consists in the process and apparatus described in the following specification and defined in the claims.

The various features of the invention are illustrated in the accompanying drawing which shows an oil treating and distilling apparatus for carrying out a process which embodies the preferred form of the invention.

In the present invention the crude oil containing salt water or natural brines, sand and other similar impurities, is forced at a very rapid rate through heated coils and is heated to a temperature at which a considerable amount of water and salt is set free from the oil. The heated mixture of oil and water then passes to a separating tank in which the speed of the liquids is greatly reduced and the sediment, salt and water which separate from the oil at this temperature settle out and are removed. The clarified oil is thereupon again passed at a high rate of speed through a second set of heated coils in which it is heated to a temperature above the boiling point of water. From this final heating the mixture of oil and water is sprayed directly into a vapor separating tower in which the oil and water are divided into a large number of fine particles and a part of the water and volatile constituents of the oil are vaporized and condensed. At the temperatures obtained in the final heating, any water remaining in the oil is settled out in a second settling tank. The oil, which is now substantially free from water, enters a battery of stills in which it is subjected to fractional distillation. The hot residue from the distillation may be used to heat the crude oil passing to the vapor separating tower.

Referring more particularly to the accompanying drawing, the crude oil is withdrawn from a crude oil storage tank 10 through a supply pipe 12 and is forced by means of a pump 14 to a heat exchanger 16 in which it is heated by hot residue from the final distillation of the oil. The heat exchanger may be of any suitable type, but for the most efficient operation it should be so proportioned that the velocities of the crude oil and of the hot residue are approximately the same. In passing through the heat exchanger, the crude oil is heated to approximately 200° F., the temperature depending for any particular case, on the temperature and quantity of the hot residuum and on the type of oil and brine being treated. At these temperatures that portion of the water or brine which forms a less stable emulsion with the oil, together with those salts, such as the sulphates and carbonates of calcium, whose solubility decreases with a rise in temperature, are set free from the oil. The speed of travel of the oil through the coils of the heat exchanger is, however, sufficient to carry the separated salt and sediment in suspension in the flowing liquid, and prevent the formation of deposits in the coil. This rapid travel of the oil also increases the efficiency of heat transfer from the hot residuum to the crude oil.

From the heat exchanger the oil carrying with it the suspended salt, sediment and water, passes through a pipe 18 to a settling tank 20. The settling tank 20 may be of any suitable type and in the present instance consists of a large cylinder, similar to those used on tank cars, and provided with a number of baffles 22 in its lower portion. The speed of the oil is greatly reduced in flowing through the settling tank 20 and as the oil passes slowly from the inlet to the outlet end of the tank, the separated water, salt, sand and other sediment settle out of the oil into the lower portion of the tank, and may be withdrawn continuously or intermittently through draw-off pipes 24. The oil is withdrawn from the upper portion of the outlet end of the tank through an outlet pipe 26 and passes to a second heat exchanger 28 at approximately the same speed as that of its passage through the heat exchanger 16. In its passage through the heat exchanger 28, the oil and water is heated to from 250° to 350° F., the temperature depending upon the temperature and quantity of the hot residuum and on the characteristics of the particular oil undergoing treatment.

To give the necessary velocity through the heating coils of the heat exchanger, the oil must be forced into the coil under a rather high head or pressure. The pressure is sufficient to prevent vaporization in the first part of the exchanger, but continually decreases as the oil approaches the end of the coil. During the latter part of the heating, when the temperature gets considerably above the boiling temperature of water and the pressure of the oil has fallen, some vaporization may take place and small amounts of salt may be thereby driven out of solution. The generation of vapor, however, increases the speed of travel sufficiently to prevent the separated salt from collecting on the walls of the coil.

From the heat exchanger 28 the oil passes through a pipe 30 to a vapor tower 32 which may be of any suitable type and which, in the present case, is substantially the same as described in my pending application, Serial No. 311,559. The oil passing from the pipe 30 enters a spray head 34 and is sprayed downwardly through the tower. A number of screens 36 are provided in the tower which serve to continually break up the particles or drops of liquid. In the tower 32 the lighter portions of the petroleum and some of the water is vaporized and the vapors are withdrawn through draw-off pipes 38 and 40 to a condenser 42.

At the high temperature maintained in the tower and with the fine division of the liquid, there is no trouble from foaming, and, since there is no heat transferring surface, there is no formation or baking of a hard scale or deposit on the walls of the tower. During the evaporation of the water and part of the oil in the tower, the temperature of the liquid reaching the bottom of the tower will have dropped 10° to 20° or more. At these temperatures, however, the water still remaining in the oil rapidly separates from the oil and immediately settles out. The oil is, therefore, drawn through a draw-off pipe 44 to one end of a settling tank 46 similar to the tank 20 in which the remaining portion of the water settles out and is removed. The water free oil is drawn from the opposite end of the tank 46 through a draw-off pipe 48 and passes through a connecting pipe 50 to the first of a battery of stills 52, 54, 56 and 58.

With some types of oil, all of the water may be vaporized in the vapor tower 32 and no salt or sediment may be separated out. In this case the oil may be by-passed through a by-pass pipe 60 from the bottom of the vapor tower to the pipe 50, the path of the liquid being controlled by valves 62, 64 and 66 in the pipes 44, 48 and 60 respectively. The oil entering the still 52 from the pipe 50 passes through one still to the next through a series of connections 68, 70 and 72, a higher boiling fraction being evaporated from the oil in each succeeding still in the customary manner of continuous distillation. From the final still 58, the hot residuum is withdrawn through a draw-off pipe 74 and pumped by means of a pump 76 and a pipe 78 to the heat exchanger 28.

The hot residuum flows through the exchanger 28 countercurrent to the crude petroleum, passes through a connecting pipe 80 to the heat exchanger 16 and flows through the heat exchanger 16 countercurrent to the direction of flow of the crude petroleum. From the heat exchanger the cooled residuum is withdrawn through a pipe 82 to a fuel oil storage tank 84.

The invention has been described in connection with a continuous distillation of petroleum, and it is particularly advantageous when continuous distillation is used with the types of oil mentioned above. The invention may, however, be advantageously applied to batch processes in which the distillation may be carried on until coke is produced in the still. In the latter types of distilling processes, no hot residuum will be available for heating the crude oil, and in this case steam or other heating means must be employed. It is not essential of course that hot residuum be used for heating the crude petroleum in any case, but it is usually the most economical method of heating where hot residuum is available for this purpose.

The process has been described as operated under atmospheric pressure, but may be operated under slightly reduced pressure or under a partial vacuum.

Having described the invention, what is claimed as new is:

1. A process of treating petroleum containing natural brines which comprises heating confined raw petroleum oil while in a rapidly moving stream by heat interchange with hot oil residuum, separating brine from the oil, additionally heating the oil by a second heat interchange with residuum, expanding the oil and removing vapor and separating additional brine and residuum therefrom.

2. A process of treating petroleum oil containing natural brines, which comprises heating said oil under pressure in a moving confined stream to a temperature at which brine separates from the oil, removing the brine which separates, continuing the heating of the oil under pressure in a flowing confined stream to a temperature above the boiling point of water, reducing the said pressure, withdrawing and condensing the vapors evolved, separating brine from the unvaporized oil, fractionally distilling the unvaporized portion of the oil, and passing the hot residuum from the distillation in a heat interchanging relation with fresh oil undergoing treatment.

3. A process of treating crude petroleum oil containing natural brines, which comprises heating said oil and brine under pressure to approximately 200° F., removing the brine which separates at this temperature, heating the oil again to from 250° to 350° F., releasing the pressure on the oil, removing and condensing the vapors evolved, separating brine from the unvaporized oil, fractionally distilling the said unvaporized oil, and passing the hot residuum from said distillation in a heat interchanging relation with said oil and brine being heated.

4. A process of treating crude petroleum oil containing natural brines, which comprises heating said oil and brine under pressure to a temperature at which a portion of the brine separates out, removing the brine which separates at this temperature, continuing the heating of the oil under pressure to from 250° to 350° F., releasing the said pressure, removing and condensing the vapors evolved, separating brine from the unvaporized oil, fractionally distilling said oil and passing the hot residuum from said distillation in a heat interchanging relation with said oil and brine being heated.

5. A process of treating petroleum containing natural brines which comprises passing said oils over a heated surface at a rapid rate of speed, dividing said stream into a large number of freely falling drops, separating the vapors from said liquid drops, and settling the water and sediment from said unvaporized oil.

6. A process of dehydrating petroleum containing natural brines which comprises heating said petroleum under pressure by an interchange of heat from hot residuum of distillation, separating brine from the heated oil, heating the separated oil to a higher temperature by an exchange of heat from hot distillation residuum, releasing the said pressure and dividing said oil into small streams, withdrawing and condensing vapors from said streams, separating water from said oil, fractionally distilling the said separated oil, and using the hot residue of distillation for the heat interchange with fresh crude oil.

7. An apparatus for treating and refining crude petroleum which comprises two heat exchanges, a water and salt separator, a vapor separating tower, means for condensing the vapor set free in said tower, a second salt and water separator, a series of oil stills and means for forcing crude petroleum successively through the heat receiving compartment of one heat exchanger, through said first water and salt separator, through the heat receiving compartment of the second heat exchanger to said vapor separating tower, and through said second salt and water separator to said oil stills, and means for passing hot residuum from said oil stills to the heating compartment of said heat exchangers.

8. An apparatus for treating and refining crude petroleum which comprises a connected series of heat exchangers, a settling tank between successive heat exchangers, a vapor tower connected to the last of said heat exchangers, a connected series of oil stills, a salt and water separator connected between said vaporizing tower and said oil stills, and means for forcing hot residuum from the said stills through said heat exchangers.

9. An apparatus for treating and refining crude petroleum which comprises a connected series of heaters, a settling tank between successive heaters, a vapor tower connected to the last of said heaters, a connected series of oil stills, and a salt and water separator connected between the said vapor tower and said oil stills.

10. A process of treating petroleum containing brine which comprises heating the said petroleum in a confined stream, separating the brine from the mixture, spraying the oil into a vaporizing space to separate vapors therefrom, withdrawing and condensing the vapors evolved from the mixture, and removing the brine from the unvaporized oil.

11. An apparatus for treating petroleum containing natural brines which comprises means for heating the said petroleum in a rapidly moving stream without an appreciable formation of vapors, means for separating brine from the said oil, means for further heating the said oil in a confined flowing stream to a higher temperature, a vapor tower, a conduit connecting the last named heating means with the said vapor tower, a vapor outlet connected to the said tower, and means for withdrawing brine from the said tower.

In testimony whereof I affix my signature.

JOHN JOSEPH ALLINSON.